United States Patent
Son

(10) Patent No.: US 7,303,477 B2
(45) Date of Patent: Dec. 4, 2007

(54) POWER TRANSMITTING DEVICE OF CLUTCHLESS COMPRESSOR

(75) Inventor: Eungi Son, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 253 days.

(21) Appl. No.: 11/074,672

(22) Filed: Mar. 9, 2005

(65) Prior Publication Data
US 2005/0209009 A1 Sep. 22, 2005

(30) Foreign Application Priority Data
Mar. 18, 2004 (KR) .................. 10-2004-0018256
Aug. 13, 2004 (KR) .................. 10-2004-0063764

(51) Int. Cl.
*F16D 9/06* (2006.01)
(52) U.S. Cl. ........................ 464/32; 474/902
(58) Field of Classification Search ............ 474/70, 474/94, 902; 464/32, 33; 417/223, 319; 192/56.5; 403/2
See application file for complete search history.

(56) References Cited

U.S. PATENT DOCUMENTS

| | | | | |
|---|---|---|---|---|
| 2,964,931 A | * | 12/1960 | Sorenson ................... 464/32 |
| 5,443,372 A | * | 8/1995 | Kanoll ...................... 417/319 |
| 7,066,819 B2 | * | 6/2006 | Ueda et al. ................. 464/32 |
| 2005/0221932 A1 | * | 10/2005 | Umemura et al. ............ 474/70 |

FOREIGN PATENT DOCUMENTS

JP 1998-299855 11/1998
JP 2002-054711 2/2002

* cited by examiner

*Primary Examiner*—Greg Binda
(74) *Attorney, Agent, or Firm*—Nixon Peabody LLP; Jeffrey L. Costellia

(57) ABSTRACT

A power transmission device for a clutchless compressor, in which, when a torque above a preset value is generated in the compressor during power transmission from an engine to the compressor, a breaking member connecting a pulley side with a hub side is broken and also the breaking member is released from the structure, thereby preventing a failure of engine belt and unnecessary noise.

13 Claims, 16 Drawing Sheets

PRIOR ART

PRIOR ART

PRIOR ART

PRIOR ART

POWER TRANSMITTING DEVICE OF CLUTCHLESS COMPRESSOR

BACKGROUND OF THE INVENTION

1. Field of the Invention

The present invention relates to a power transmission device. More particularly, the invention relates to a power transmission device for a clutchless compressor, in which, when a torque above a preset value is generated in the compressor during power transmission from an engine to the compressor, a breaking member connecting a pulley side with a hub side is broken and also the breaking member is released from the structure, thereby preventing a failure of engine belt and unnecessary noise.

2. Background of the Related Art

In general, a car air-conditioning system serves to maintain the interior temperature of a car below an outside temperature through a cyclic operation of compression, condensation, expansion and evaporation of refrigerant.

The above cyclic operation requires essentially a compressor, a condenser, an expansion valve and an evaporator.

Among the above-required devices, the compressor includes a variable displacement compressor, in which a required power can be controlled, depending on the conditions of the system. Recently, this variable displacement compressor has widely used.

This variable displacement compressor does not need a clutch for interrupting a driving power transmitted from an engine to the compressor.

During the operation of the compressor, occasionally, an overload torque way above a normal transmission torque occurs inside the compressor, due to a failure such as seizing, so that the pulley can not rotate any more.

At this time, the engine belt, which is driven by the engine, keeps sliding on the pulley and wearing itself (a belt slip), and consequently is broken due to the friction heat generated between the pulley and the belt.

As one attempt in order to solve the above problems, Japanese Laid-open Patent Application Ser. No. 1998-299855 discloses a power transmission device, which is shown in FIG. 1.

As shown in FIG. 1, the convention power transmission device 1 includes a coupling means. The coupling means includes a pulley 2 to be rotated by a rotating power from a rotation power source, a hub 3, 4 coupled to a rotation shaft of a driven-side device, an resilient member 5 connecting the hub 3, 4 and the pulley 2 and being capable of elastic deformation, and a first and second support member 6, 8 for supporting the resilient member 5.

The resilient member 5 is installed concentrically with the hub 3, 4 and the pulley 2. The first support member 6 is connected with the hub 3, 4 and the second support member 8 is connected with the pulley 2.

The first support member 6 supports one side face of the outer circumference or the inner circumference of the resilient member 5. The second support member 8 supports the outer peripheral face of the outer circumference and the inner circumference of the resilient member.

When the rotating force is within a certain predetermined value, the coupling means presses in the rotational direction the resilient member 5 and the both support members 6, 8. Thus, the resilient member 5 is integrally supported between both of the support members 6 and 8 such that the hub 3, 4 is connected integrally with the pulley 2.

When the rotating force is increased above the predetermined value, i.e., under overload, at least one of the outer circumference and the inner circumference is deformed and thus a sliding is occurred between the surface of the resilient member 5 and at least one of both support members 6 and 8. Therefore, the connection between the hub 3, 4 and the pulley 2 is interrupted.

In addition, a low rigid member 7 is formed in at least one side of the both support members 6 and 8. In the region of a higher rotating power, at least one side of the both support members 6 and 8 is deformed by the low rigid member 7, thereby lowering a relative torsional spring coefficient between both support members 6 and 8 against the rotating power.

The assembling procedures of the conventional power transmission device having the above-described construction will be explained below.

First, the second support member 8 is installed in the pulley 2, which is then installed in a nose portion 51a of a front housing 51 in a compressor 50.

Thereafter, the resilient member 5 is adhered and fixed on the second support member 8.

Next, an installation body, which is comprised of the hub 3, 4 and the first support member 6 integrated therewith, is assembled into the resilient member and the rotating shaft of the compressor. This installation body is fixed to the rotating shaft using a bolt 9 to thereby finish the assembling.

As described above, the conventional power transmission device having the above construction is comprised of a number of elements such as a pulley 2, a hub 3, 4, a first and second support member 6, 8, and a resilient member 5, which leads to complicated assembling procedures and consequently a long assembling time.

In addition, the convention power transmission device 1 embraces a further problem in that the manufacturing cost is increased, due to such a large number of constitutional elements.

Furthermore, in the conventional power transmission device 1, the pulley is formed of a ferrous metallic material or a plastic material using an injection molding process. Depending on the material of the pulley 2, the forming method for the resilient member 5 and the first and second support member 6, 8 is varied and thus a common forming process cannot be employed disadvantageously.

In addition, in the conventional power transmission device 1, if the design specification of the pulley 2 is changed, those of the resilient member 5 and the first and second support member 6, 8 must be changed together.

On the other hand, FIG. 2 shows another conventional power transmission device. As depicted in FIG. 2, this conventional power transmission device includes a pulley 10 rotatably installed in a front housing 51 of a compressor and rotated by a rotating power from a driving power source such as an engine, a hub 20 to be coupled to a driving shaft 60 of the compressor, and an outer hub 30 connecting the pulley 10 with the hub 20.

FIG. 3 shows a hub in the conventional power transmission device of FIG. 2. As shown in FIG. 3, the hub 20 includes a hub body 21 to be connected to a driving shaft 60 of a compressor 50, an inner ring 22 formed in the outer peripheral face of the hub body 21, an outer ring 23 arranged spaced apart from the inner ring 22 and having plural through-holes 23a so as to increase the connection force with the outer hub 30, and a breaking member 24 connecting the inner ring 22 and the outer ring 23.

The outer hub 30 is made of resin. The inner circumference of the outer hub 30 is connected to the outer ring 23 of the hub 20 using an insert injection molding. The outer circumference thereof is coupled to the pulley 10 by inserting a pin 31 into a damper 32, which is provided in a hole 11 formed in the pulley 10. Therefore, power transmission can be carried out from the pulley 10 to the hub 20.

Therefor, in case where the compressor-side load torque is within a pre-setup value, the rotating power of the pulley 10, which is connected with an engine through an engine belt, is transmitted to the driving shaft 60 of the compressor 50 through the outer hub 30 and the hub 20, thereby driving the compressor 50.

On the other hand, when the compressor 50 produces a torque above the pre-determined value, the driving shaft 60 and the hub 20, the pulley 10 and the like stop rotating. At this time, the engine and the pulley 10 connected thereto by the engine belt keep trying to rotate, and consequently the breaking member 24 of the hub 20 is broken, thereby instantly interrupting the power transmission path form the pulley 20 to the driving shaft 60 to thereby avoid damage of the compressor.

That is, when a torque above a preset value is produced in the compressor 50, the breaking member 24 of the hub 20 is broken to thereby protect the compressor from damage. At this time, however, the pulley 10 keeps rotating and the hub 20 stops. Thus, the broken side of the breaking member 24 makes excessive noise.

In addition, if the interference of the broken side continues, impact load is exerted to the engine belt several times, which also consequently is failed.

Furthermore, since it has no structure for fixing the outer ring 23 of the hub 20, the outer hub 30 can be released from the transmission device, together with the outer ring 23, after the breaking member 24 is broken. In the case where the outer ring 23 and the outer hub 30 are escaped, they hit other peripheral equipment, which thereby suffers a fatal damage.

SUMMARY OF THE INVENTION

Therefore, the present invention has been made in view of the above problems, and it is an object of the present invention to provide a power transmission device for a clutchless compressor, in which a connector can be commonly used regardless of the material or the forming process of the pulley, the structure of the connector is simplified to provide a damping means and thus reduce the manufacturing cost, and when the design specification and shape of the pulley are changed, the structure of the connector can be partially modified in order to resiliently conform to a change in the pulley.

Another object of the invention is to provide a power transmission device, in which a separate connector having a breaking member is connected in one side of the pulley and also the entire connector is wrapped around by the hub, so that, after the breaking member is broken, the connector is not released and prevent the broken debris from scattering, and is protected from an external impact.

A further object of the invention is to provide a power transmission device, in which, when a torque above a preset value is generated in the compressor, the breaking member connecting the pulley side with the hub side is broken and a remaining breaking member causing an interference is broken in sequence at certain time intervals to thereby separate from the structure of device, thereby avoiding a failure of the engine belt and unnecessary noise.

To accomplish the above object, according to one aspect of the present invention, there is provided a power transmission device for a clutchless compressor. The power transmission device comprises: a pulley rotatably installed in a front housing of a compressor and rotated by a rotational force from a driving power source, a hub disposed in one side of the pulley and having a hub body to be connected with a driving shaft of the compressor, and a connector connecting the pulley with the hub. The pulley includes a protruding flange formed in one side face thereof. The hub has a cover plate integrally formed in the outer peripheral face of the hub body. The connector includes a drive-side connection member detachably connected to one side of the pulley through a first coupling means, a driven-side connection member connected to the hub through a second coupling means, and a breaking member for connecting the drive-side connection member with the driven-side connection member so as to be broken when a torque above a pre-set value is generated in the compressor.

The first coupling means comprises the flange and the drive-side connection member that are screwed together.

The first coupling means may be comprised by the flange and the drive-side connection member that are connected by forcibly press-fitting the flange into the inside of the drive-side connection member. In this case, a projected and recessed part may be formed in at least one of the outer peripheral face of the flange and the inner peripheral face of the drive-side connection member.

The connector is disposed in an inner space formed between the cover plate of the hub and the pulley.

Preferably, the pulley may be made of a synthetic resin material and the flange may be made of a steel material.

The second coupling means is formed of a plurality of coupling grooves formed in the outer peripheral face of the driven-side connection member, a damper to be connected to the coupling groove, and a projection formed in the inner face of the cover plate of the hub and to be connected with the damper.

In the bottom of the coupling groove is formed a connection plate protruded such that the damper can be inserted and connected thereto.

The damper includes a pair of resting portions to be rested on the coupling groove and spaced apart from each other such that the projection can be inserted and connected in-between, and a supporting portion connecting the pair of resting portions with each other and forming an inserting groove so as to be inserted into the connection plate.

Preferably, the bottom face and the inner side wall face of the coupling groove may be bent in a rounded shape.

The drive-side connection member may be provided with a breaking portion formed so as to break a remaining breaking member still existing in the driven-side connection member in case where the breaking member is broken.

The breaking portion is protrusively formed from the outer peripheral face of the drive-side connection member.

Preferably, the breaking portion may be formed in different arrangement angles from each breaking member such that it contacts each corresponding remaining breaking member in certain time intervals.

The flange may be integrally formed in one end portion of a bearing bore, which is installed in a through-hole of the pulley.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The preferred embodiments of the invention will be hereafter described in detail, with reference to the accompanying drawings. Details on the same elements as in the conventional power transmission devices and their operation will not be repeated here.

Figure 1:
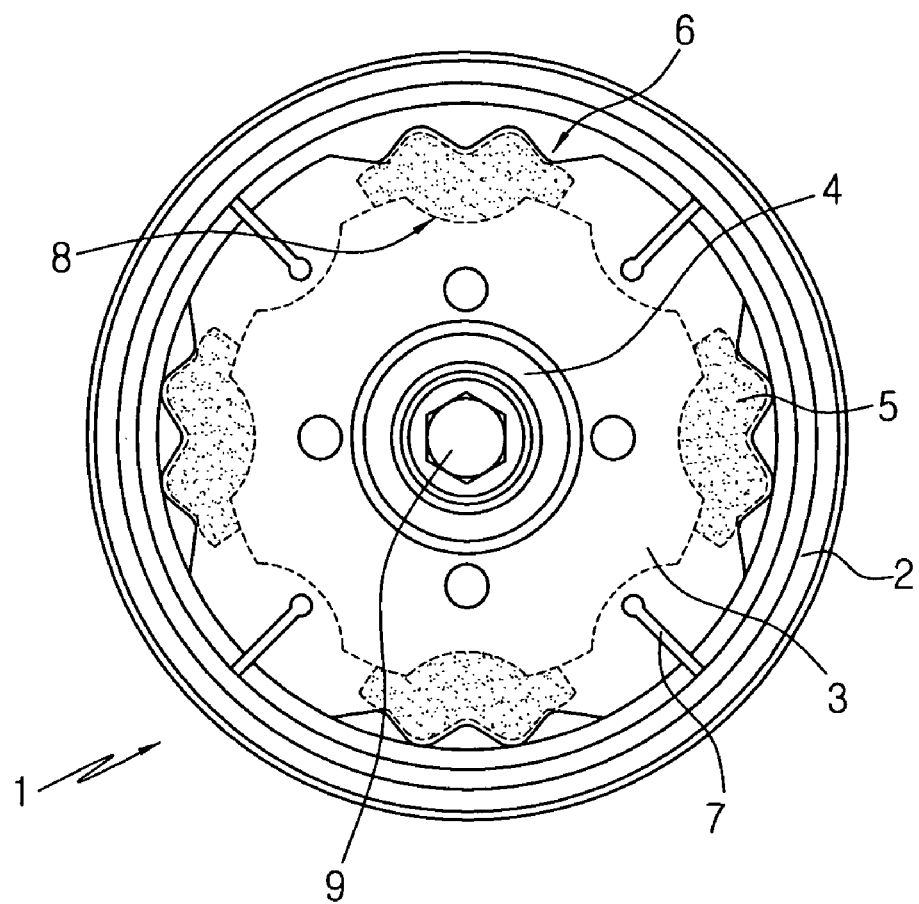
FIG. 1 shows a conventional power transmission device.
Figure 2:
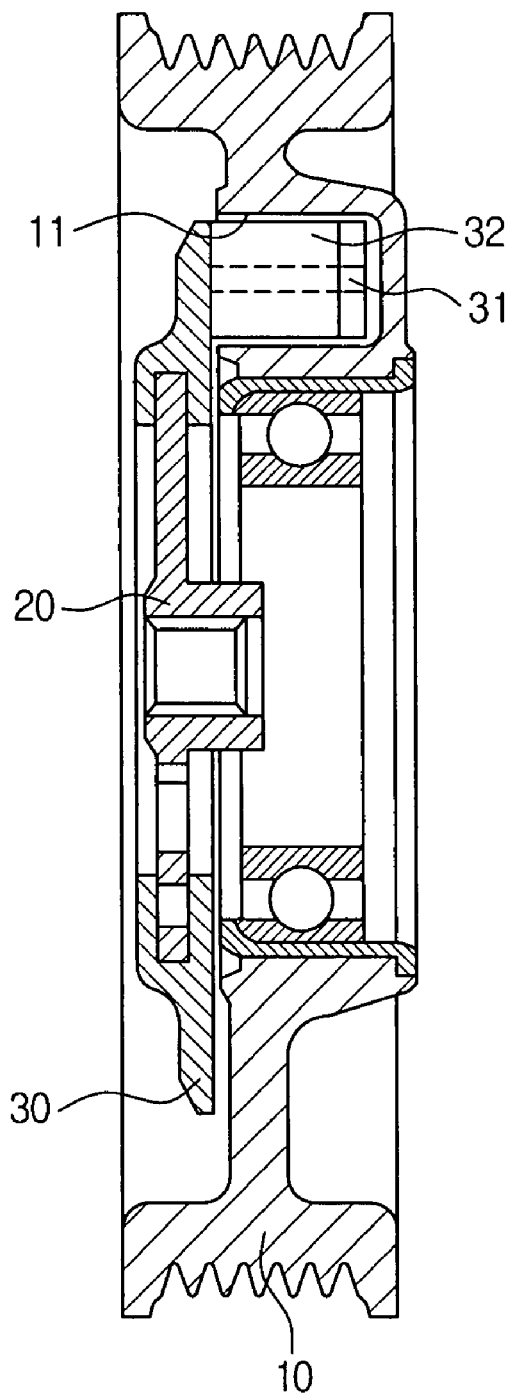
FIG. 2 is another conventional power transmission device.
Figure 3:
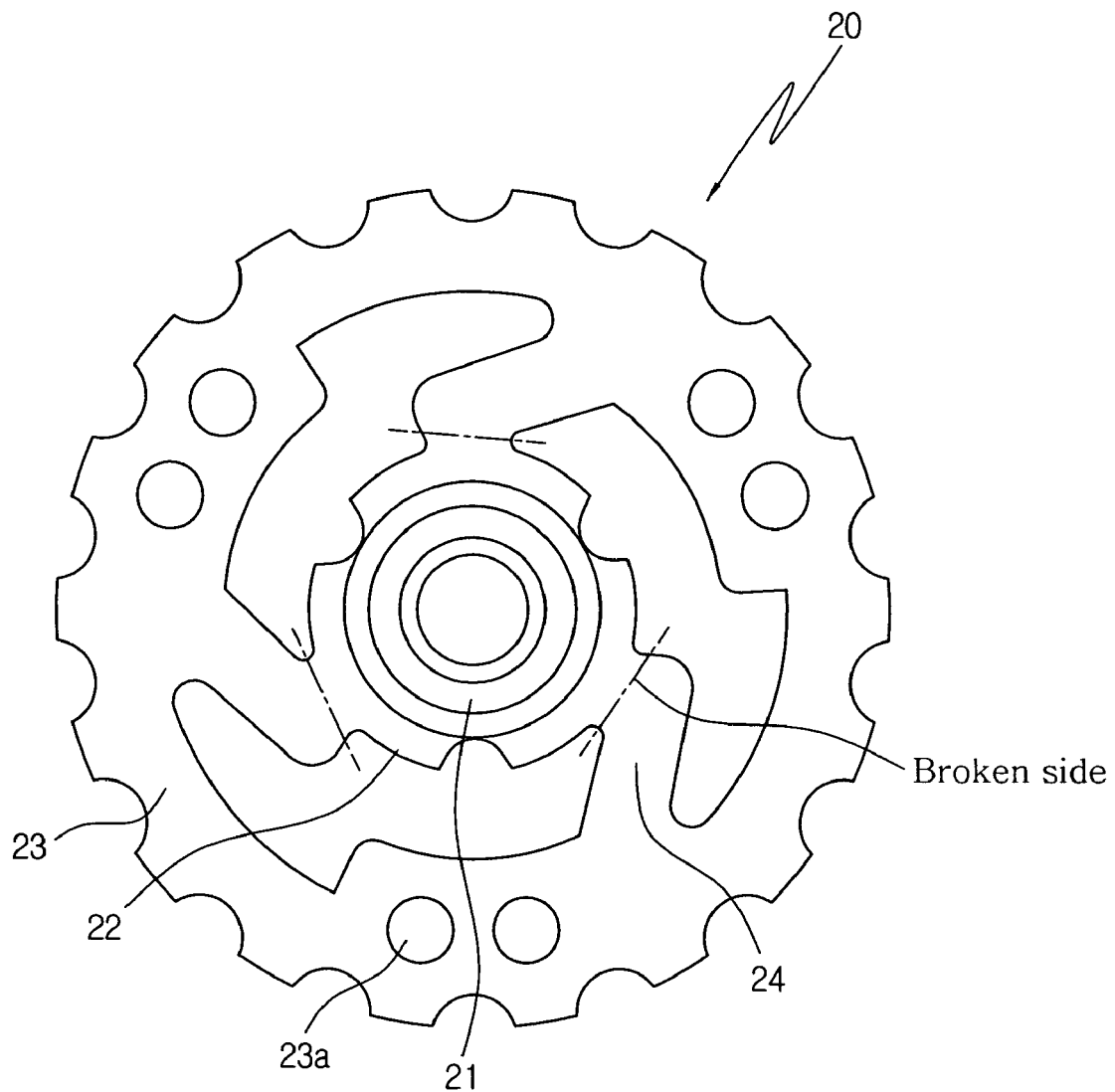
FIG. 3 shows a hub in the conventional power transmission device of FIG. 2.
Figure 4:
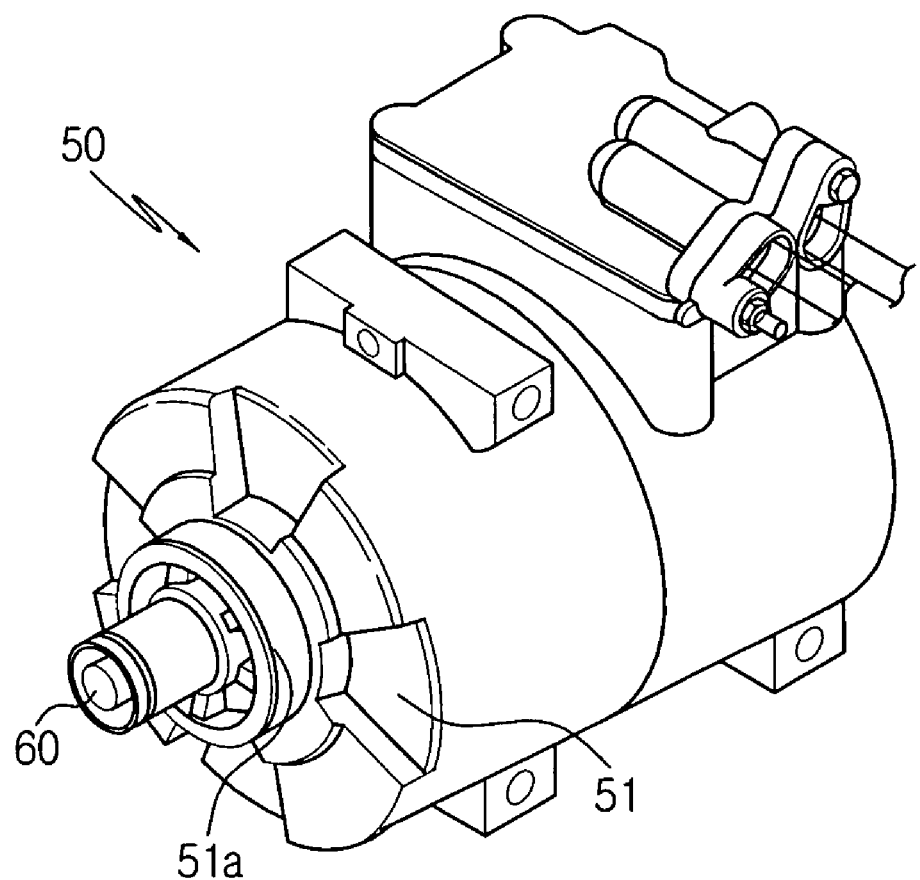
FIG. 4 is a perspective view of a general compressor to which power transmission devices are connected.
Figure 5:
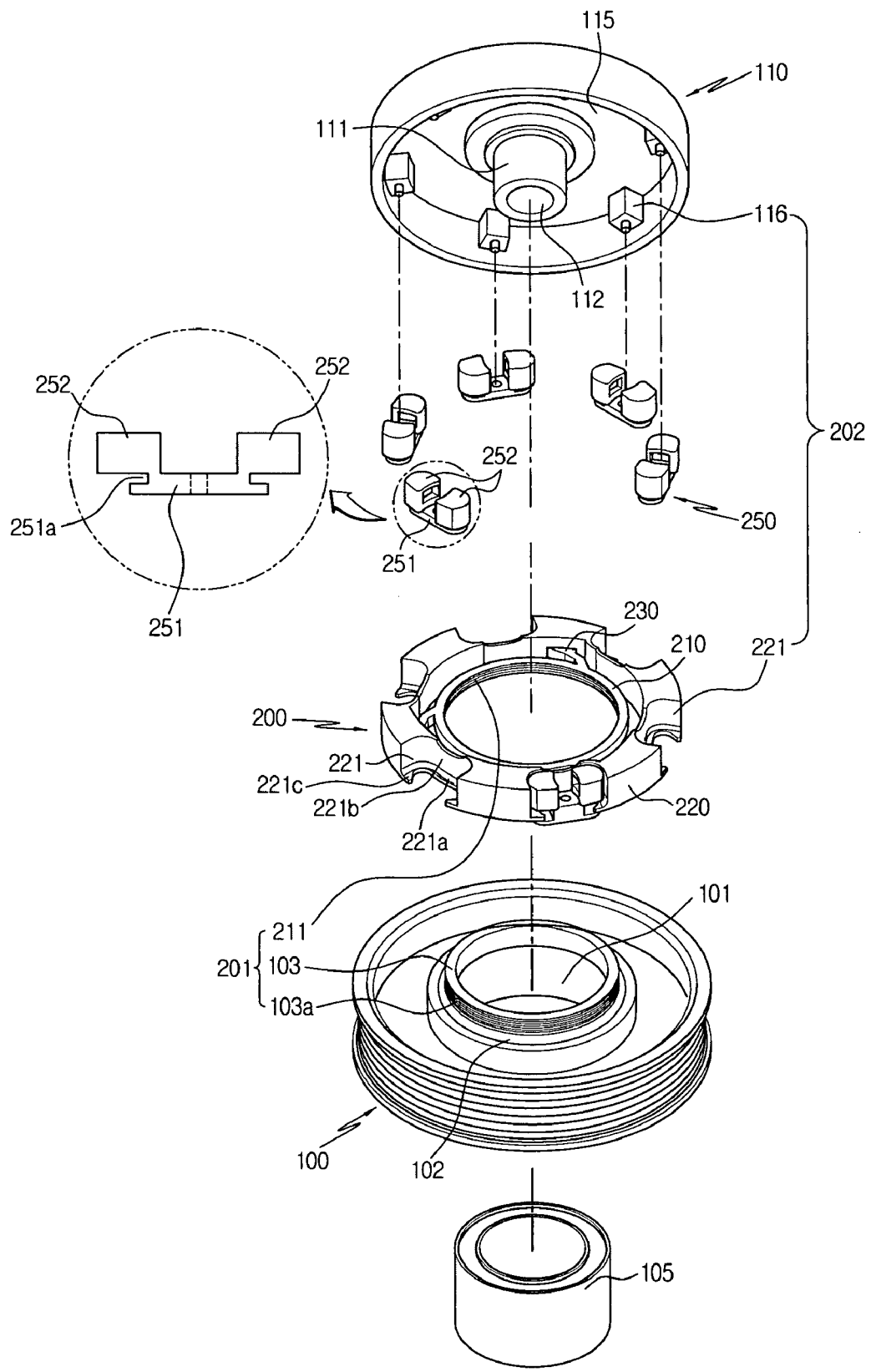
FIG. 5 is an exploded perspective view of a power transmission device according to a first embodiment of the invention.
Figure 6:
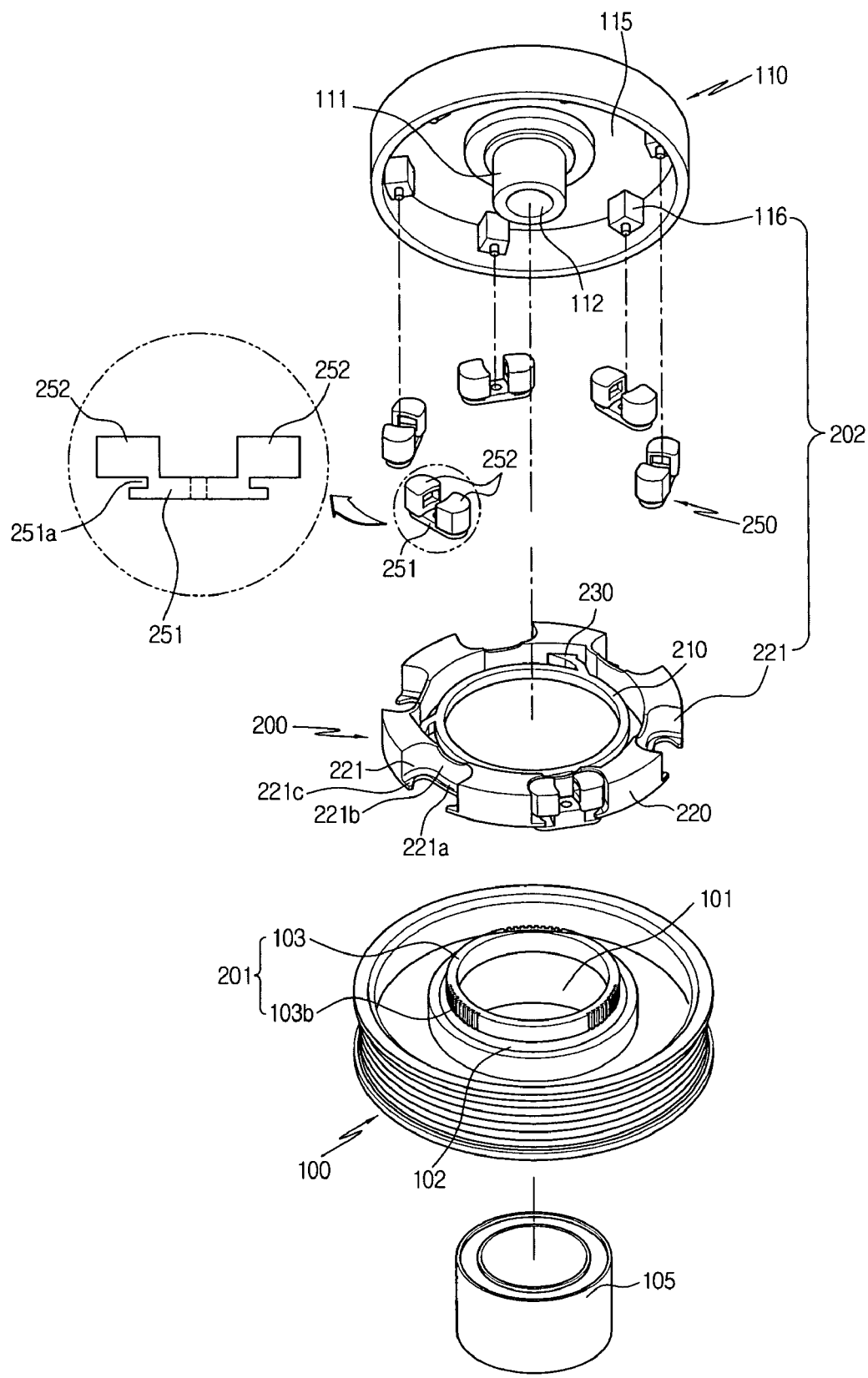
FIG. 6 is an exploded perspective view of a power transmission device according to another embodiment of the invention, where a connector between a drive-side coupling member and a flange of a pulley is modified.
Figure 7:
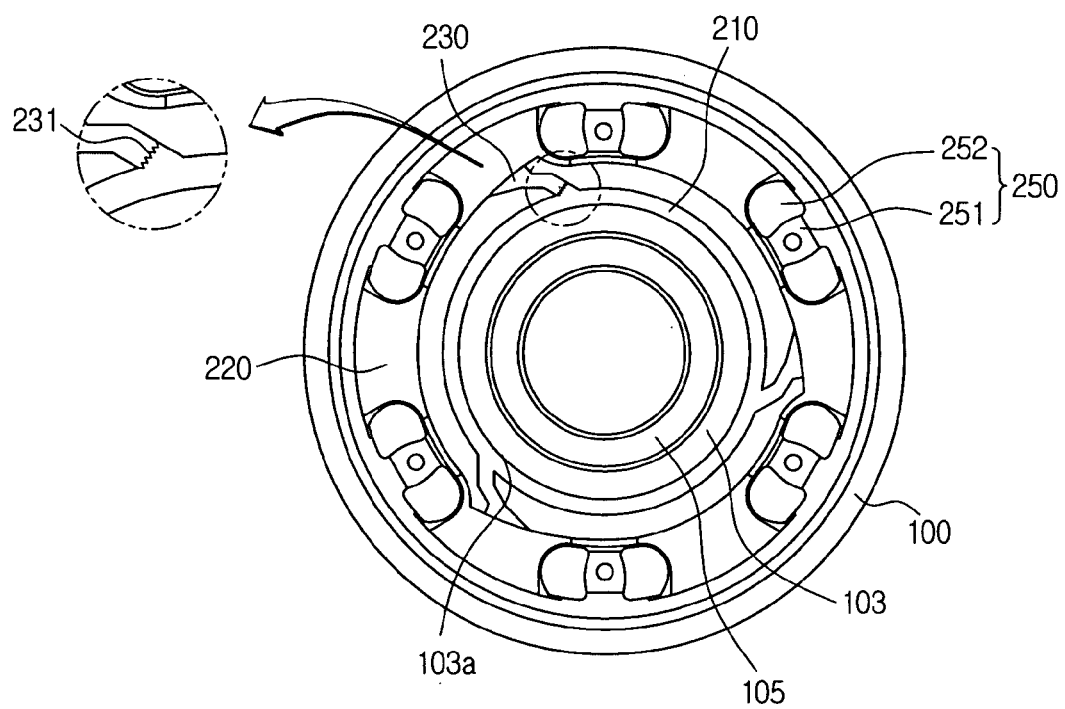
FIG. 7 illustrates one embodiment of the connection of a pulley with a connector in which a damper is rested, in the power transmission device of the first embodiment of the invention.
Figure 8:
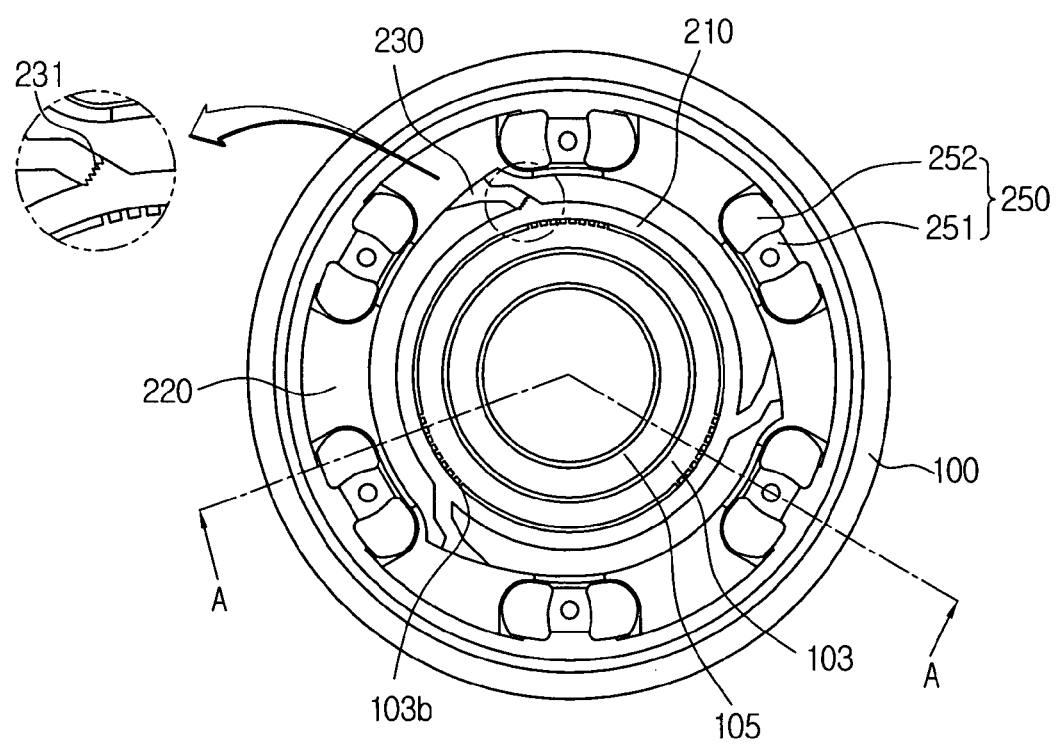
FIG. 8 illustrates another embodiment of the connection of a pulley with a connector in which a damper is rested, in the power transmission device of the first embodiment of the invention.
Figure 9:
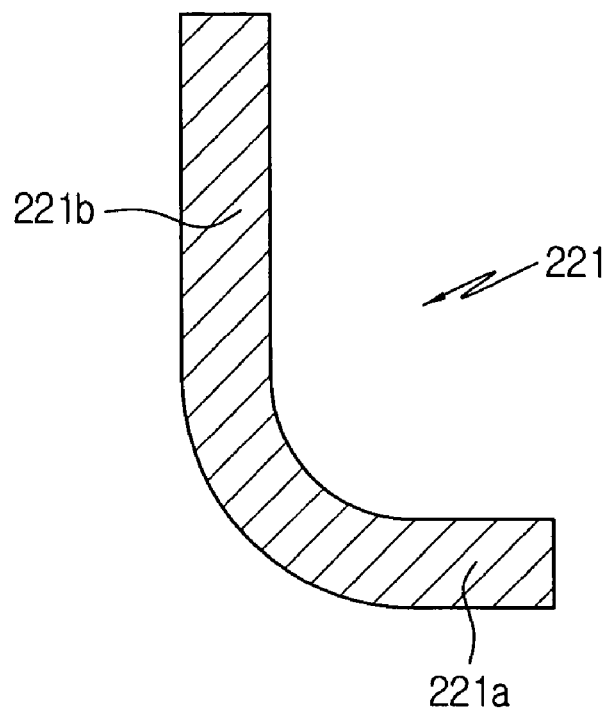
FIG. 9 is a cross-section of a coupling groove of a connector in the power transmission device according to the first embodiment of the invention.
Figure 10:
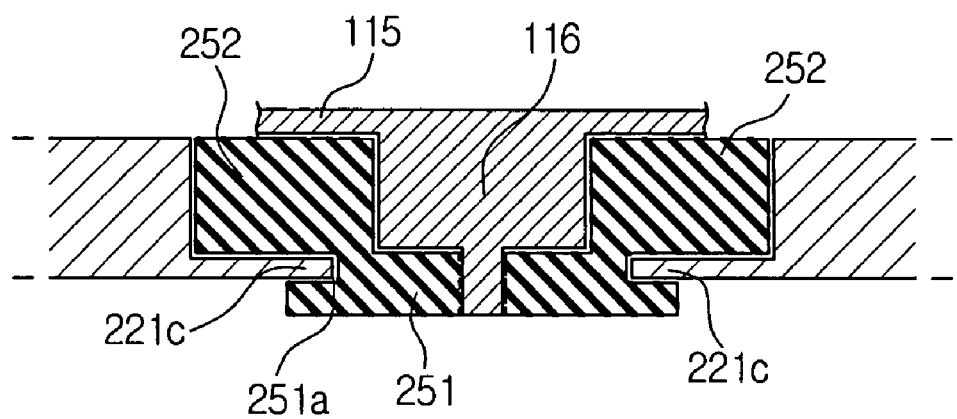
FIG. 10 is a partial cross section showing a connected state of a damper and a projection in the power transmission device according to the first embodiment.
Figure 11:
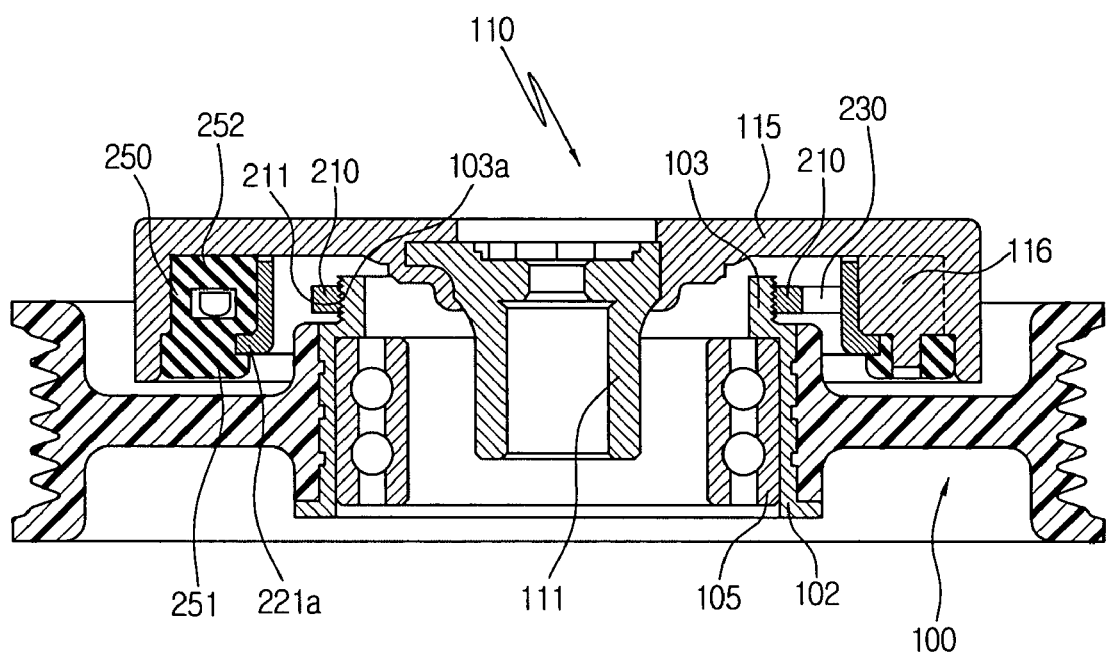
FIG. 11 shows a cross-section A-A of the power transmission device of FIG. 8 according to the first embodiment of the invention.

FIG. 5 is an exploded perspective view of a power transmission device according to a first embodiment of the invention. FIG. 6 is an exploded perspective view of a power transmission device according to another embodiment of the invention, where a connector between a drive-side coupling member and a flange of a pulley is modified. FIG. 7 illustrates one embodiment of the connection of a pulley with a connector in which a damper is rested, in the power transmission device of the first embodiment of the invention. FIG. 8 illustrates another embodiment of the connection of a pulley with a connector in which a damper is rested, in the power transmission device of the first embodiment of the invention. FIG. 9 is a cross-section of a coupling groove of a connector in the power transmission device according to the first embodiment of the invention. FIG. 10 is a partial cross section showing a connected state of a damper and a projection in the power transmission device according to the first embodiment. FIG. 11 shows a cross-section of the power transmission device according to the first embodiment of the invention.

As illustrated in the figures, the power transmission device of the invention includes a pulley 100, a hub 110 and a connector 200.

The pulley 100 is rotatably installed in a nose portion 51a protruded from a front housing 51 of a compressor 50, and rotated by a rotating force from a driving power source, i.e., an engine. In one side of the pulley 100 is formed a flange 103, which is protruded therefrom.

This is, in the center of the pulley 100 is formed a through-hole 101, in which a bearing 105 is installed. Thus, the pulley 100 is rotatably installed in the nose portion 51a of the front housing 51.

On the other hand, the flange 103 may be integrally formed with the pulley 100 using the same material. Alternatively, a separate bearing bore 102 may be inserted into the through-hole 101 and a flange 103 may be formed in one end portion of the bearing bore 102 so as to be protruded therefrom.

In case where a bearing bore 102 is installed inside the through-hole 101, inside the bearing bore 102 is installed a bearing 105.

In addition, the bearing bore 102 is formed of a steel material in order to prevent a reduction in durability, which may occurs due to the frictional heat generated by the driving of the compressor 50. The flange 103 is formed of a steel material since it is coupled with the connector 200 and thus a large torque is exerted thereon. Therefore, even if the pulley 100 may be formed of a synthetic resin material, the bearing bore 102 and the flange 103 is made of a steel material, thereby simplifying the structure thereof and improving its durability.

Furthermore, the bearing bore 102 and the pulley 100, which are integrally formed with the flange 103, may be formed of a steel material.

On the other hand, the pulley and the flange 103 may be formed of different materials using a double injection molding. Preferably, the pulley is made of a synthetic material and the flange 103 is formed of a steel material.

The hub 110 comprises a hub body 111 and a cover plate 115 integrally formed in the outer circumference of the hub body 11. The hub body 111 is to be disposed inside the through-hole 101 formed in the center of the pulley 100 and coupled to the driving shaft 60 of the compressor 50.

Preferably, the hub body 111 and the cover plate 115 are formed using a double injection molding.

In the hub body 111 is formed a connection hole 112, into which the driving shaft 60 is inserted.

The edge area of the cover plate 115 is bent towards the pulley 100 so as to wrap around the entire connector 200, which will be described hereinafter. That is, the connector 200 is installed in such a way as to be disposed in an inner space formed between the cover plate 115 and the pulley 100.

The connector 200 is comprised of a driven-side connection member 220 to be coupled with the hub 110, a drive-side connection member 210 to be connected with the pulley 100, and a plurality of breaking members 230 connecting the driven-side connection member 220 with the drive-side connection member 210.

First, the driven-side connection member 220 is disposed along the outer periphery of the flange 103 in one side of the pulley 100 so as to transmit the rotating force of the pulley 100 to the hub 110, and at the same time connected into the cover plate 115 of the hub 110 and a second coupling means 202.

Here, the second coupling means 202 is formed at certain regular intervals along the outer peripheral face of the driven-side connection member 220. It is composed of a plurality of coupling grooves 221 having a connection plate 221c protruded inwardly at the bottom thereof, a damper 250 resting on the coupling groove 221 and inserted into the connection plate 221c for absorbing an impact, and a projection 116 formed in the inner face of the cover plate 115 of the hub 110 and coupled with the damper 250.

It is preferred that the damper 250 is made of a rubber material having certain elasticity.

The above damper 250 is rested on both sides of the coupling groove 221, the damper 250 includes a pair of resting portion 252 spaced apart from each other in order for the projection 116 to be inserted and connected thereinto, and a supporting portion 252 connection the pair of resting portions 252 and forming an inserting groove 251a. The inserting groove 251 is structured such that it is inserted into the connection plate 221c, while closely abutting against the bottom face of the driven-side connection member 220 corresponding to the coupling groove 221.

Therefore, the projection 116 formed inside of the cover plate 115 is inserted between the pair of resting portions 252, so that the hub 110 and the connector 200 can provide an elastic connection structure through the damper 250.

In addition, as shown in FIG. 9, the bottom face 221a and the inner wall face 221b of the coupling groove 221 are formed so as to be rounded, thereby providing an adequate magnitude of damping while reducing the size of the damper 250.

The drive-side connection member 210 is disposed at regular intervals inside the driven-side connection member 220, and detachably coupled into the flange 103 and a first coupling means 201.

Here, the first coupling means 201 is formed in such a manner that the outer circumference of the flange 103 is thread-coupled with the inner circumference of the drive-side connection member 210 by means of the respective threads 103a and 211 formed thereon.

In addition, besides the above thread-coupling, the first coupling means 201 may be formed by press-fitting the flange 103 into forcibly the drive-side connection member 210. In this case, preferably, projected and recessed parts 103b is formed in either one of the outer peripheral face of the flange 103 or the inner peripheral face of the drive-side connection member 210, thereby increasing the connection force therebetween.

As described above, in case where the projected and recessed parts 103b is formed, when the flange 103 is forcibly press-fitted into the drive-side connection member 210, the projected and recessed parts 103b is squeezed and pressed in-between to thereby improve the connection force therebetween.

Although the projected and recessed parts 103b is formed in the outer peripheral face of the flange 103, it may be formed in the inner peripheral face of the drive-side connection member 210.

The breaking member 230 is formed so as to connect the drive-side connection member 210 and the driven-side connection member 220 with each other in such a way that, when a torque above a certain setup value is generated in the compressor 50, the breaking member 230 is broken to thereby interrupt the power transmission path between the drive-side connection member 210 and the driven-side connection member 220.

The assembling procedures of the power transmission device having the above construction according to the first embodiment of the invention will be described below.

First, the bearing 105 is inserted into the inner peripheral face of the through-hole 101 of the pulley, which then is installed in the nose portion 51a formed in the front housing 51 of the compressor. Thereafter, the flange 103 of the pulley 100 is coupled with the drive-side connection member 210 of the connector 200.

Here, according to the invention, the connector 200 can be commonly used, regardless of the material and the forming process of the pulley 100.

Furthermore, in the present invention, in the case where the design specification and shape of the pulley 100 is changed, only part of the structure of the connector 200 can be modified to thereby resiliently conform to a change in the pulley 100.

For example, when the smooth flat outer surface of the flange 103, which is formed in the pulley 100, is changed to have a thread 103a formed therein, the inner face of the drive-side connection member 210 of the connector 200 only have to be machined so as to form a threaded portion 211 thereon.

That is, in case where the outer face of the flange 103 is changed into whatever form, the inner face of the drive-side connection member 210 can be simply changed to fit to the changed outer face of the flange 103.

Next, the damper 250 is rested on the plurality of coupling grooves 221 of the drive-side connection member 220 in such a way that the connection plate 221c formed in the coupling groove 221 is inserted into an inserting groove 251a of the damper 250.

Thereafter, the hub 110 is assembled above the connector 200 in such a way that the projection 116 formed in the inner face of the cover plate 115 of the hub 110 is inserted into between the pair of the resting portions 252 of damper 250.

Finally, the driving shaft 60 of the compressor 50 is connected with a connection hole 112 of the hub 110 through the bearing 105 installed in the through-hole 101, thereby completing the assembling procedure.

The operation of the power transmission device according to the first embodiment of the invention will be described below.

When a driving power source, i.e., the engine, transmits its rotating force to the pulley 100, the pulley is rotated and its rotational torque is transmitted into the hub 110 to thereby the driving shaft 60 of the compressor 50, which is connected to the hub 110.

At this time, if a failure, such as seizing, occurs inside the compressor 50 and the driving shaft 60 stops rotating, the hub 110 suffers a torque larger than when it rotates. If the torque exceeds a preset value, the breaking members 230 of the connector are simultaneously broken. That is, as shown in FIGS. 7 and 8, the connection portion with the drive-side connection member 210 is broken at a broken side 231.

Therefore, the hub 110, which is coupled with the stopped driving shaft 60 of the compressor 50, and the driven-side connection member 220 of the connector 200, which is coupled with the projection 116 of the hub 110 remains stopped. However, the drive-side connection member 210 and the pulley 100, which is separated from the driven-side connection member 220, continues to rotate along with the engine belt. Therefore, the engine belt installed in the outer peripheral face of the pulley can be prevented from a failure caused by a sliding.

In addition, as described above, the separate connector 200 having the breaking member 230 is coupled to one side of the pulley 100, and simultaneously the cover plate 115 of the hub 110 is installed in such a way to wrapped around the entire connector 200. Even if the breaking member 230 is broken, the connector 200 is not escaped from the whole structure, and the broken debris is prevented from scattering, thereby protecting the connector 200 from an external impact.

Figure 12:
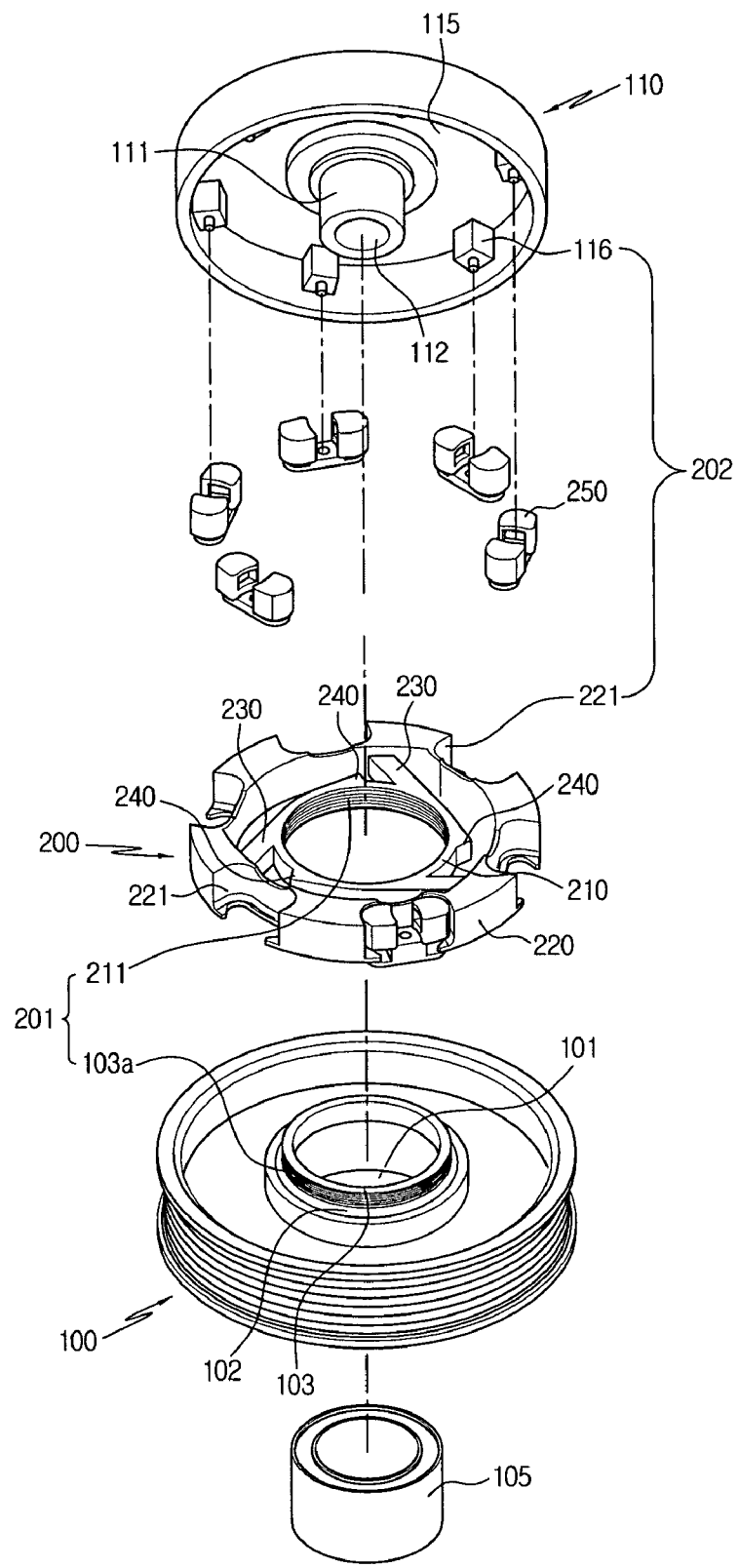
FIG. 12 is an exploded perspective view of a power transmission device according to a second embodiment of the invention.
Figure 13:
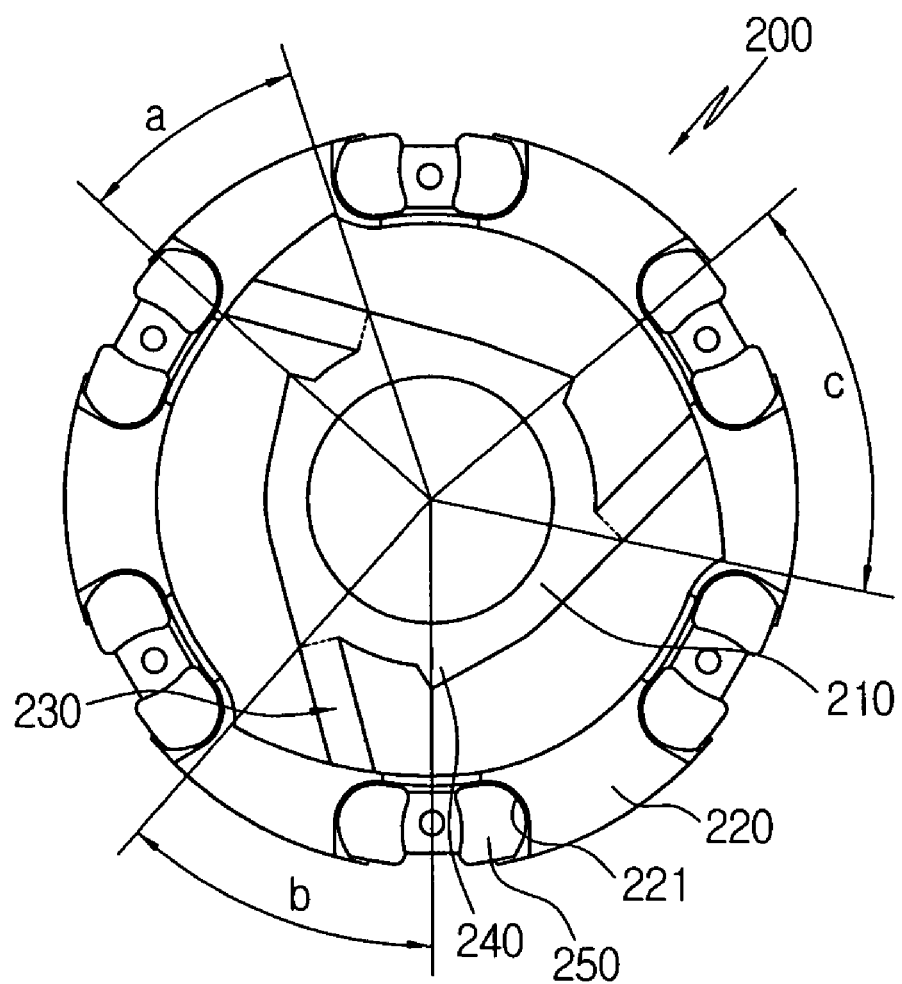
FIG. 13 is a plan view of a connector in the power transmission device of the second embodiment of the invention.
Figure 14A:
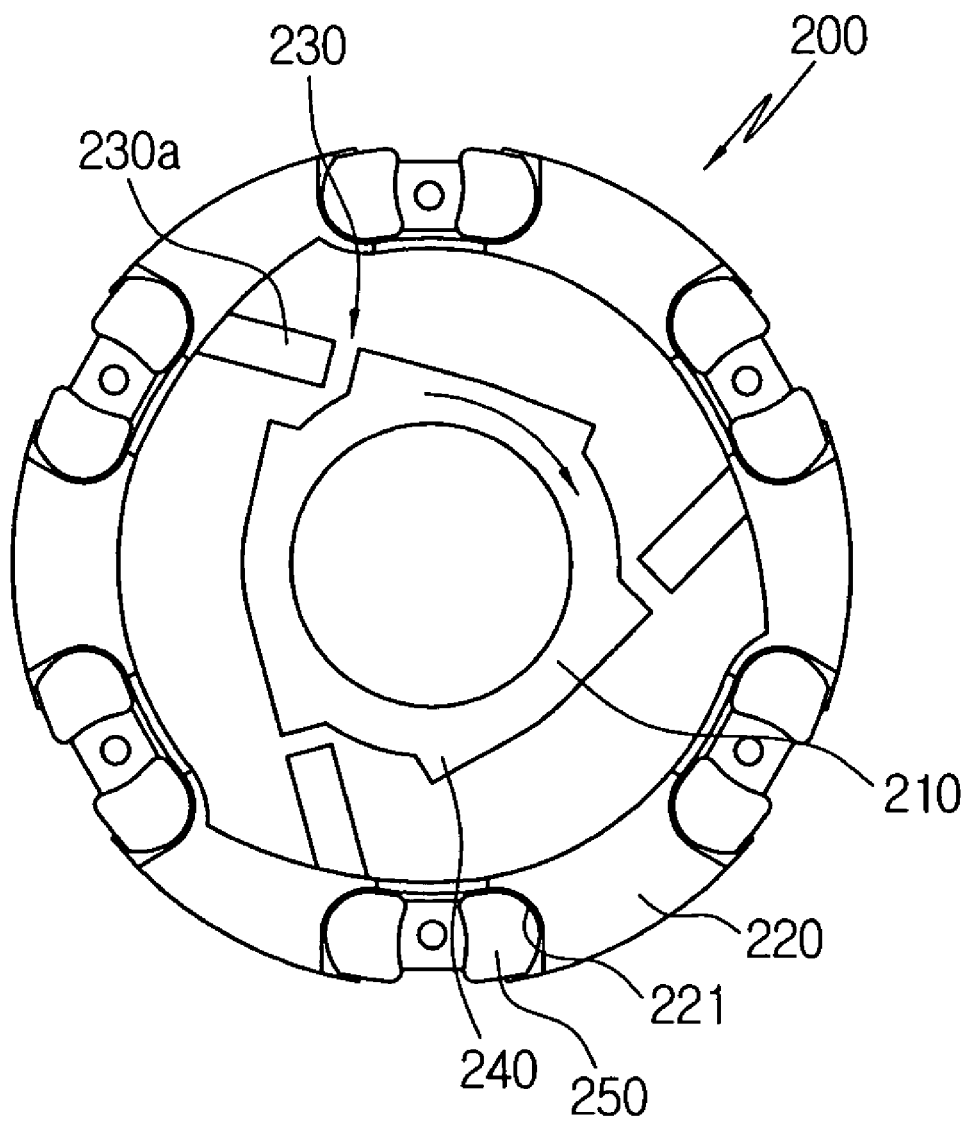
FIGS. 14a to 14d show the behavior of a breaking member in the connector of the power transmission device according to the second embodiment of the invention.
Figure 14B:
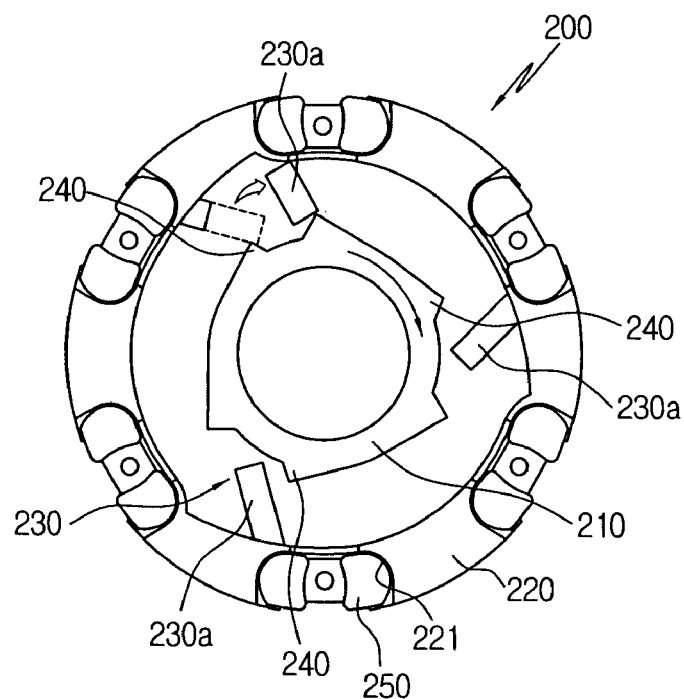
Figure 14C:
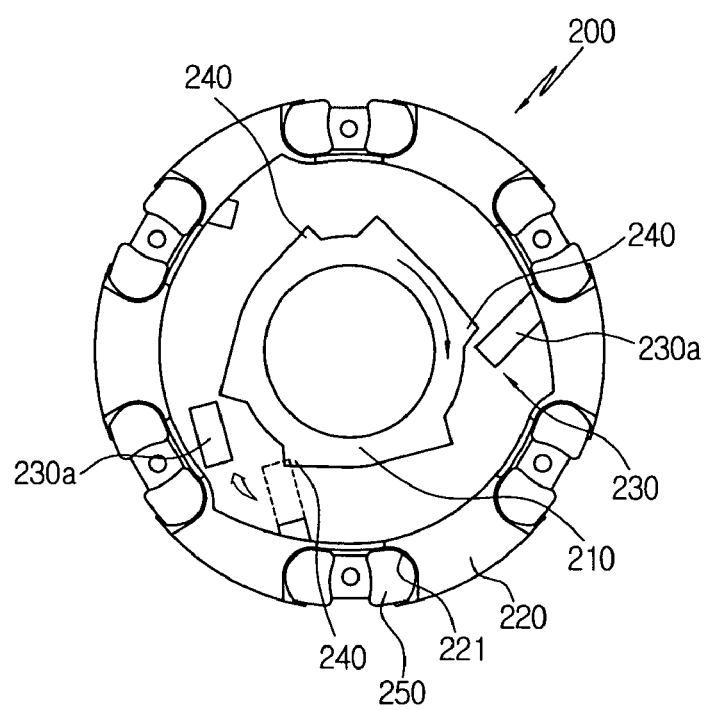
Figure 14D:
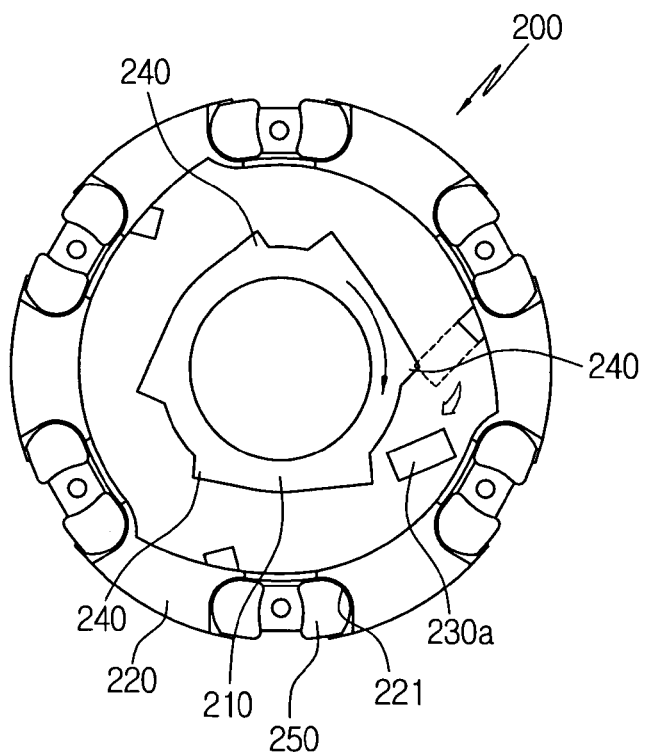

FIG. 12 is an exploded perspective view of a power transmission device according to a second embodiment of the invention. FIG. 13 is a plan view of a connector in the power transmission device of the second embodiment of the invention. FIGS. 14a to 14d show the behavior of a breaking member in the connector of the power transmission device according to the second embodiment of the invention. Details on the same elements as in the first embodiment will not be repeated here.

As shown in the figures, the general construction of the second embodiment is the same as that of the first embodiment, except for a breaking portion 240. The breaking portion 240 is constructed in such a way that, after break of the breaking member 230, a remaining breaking member 230a is broken and eliminated, and thus prevented from remaining in the driven-side connection member 220 and causing interference with the drive-side connection member 210, thereby avoiding unnecessary noise generated from the interference.

On the other hand, inside the driven-side connection member 220, the breaking member 230 is connected in a tangential direction with the drive-side connection member 210, thereby providing a favorable structure against fatigue.

In addition, the breaking portion 240 is formed in the outer circumferential face of the drive-side connection member 210 so as to be protruded therefrom. At the same time, the breaking portion 240 is formed in such a way to have different arrangement angles a, b, c from each breaking member 230, so that it contacts the remaining breaking member 230a in sequence at different times, as illustrated in FIG. 13.

Here, the breaking portion 240 is preferred to have a triangular shape.

That is, as shown in the FIG. 13, in a case of three breaking members 230 and three breaking portions 240 formed correspondingly thereto, with respect to the center point of the drive-side connection member 210, each arrangement angle a, b, c between each respective breaking member 230 and each corresponding breaking portion 240 is configured so as to satisfy an equation a≠b≠c.

Therefore, when a torque above a pre-determined value is generated in the compressor 50, the three breaking member 230 are primarily broken simultaneously, and at this time, each of the three breaking portions 240 is collided with each remaining breaking members 230a at certain time intervals. Thus, the three remaining breaking members 230a are secondarily broken in sequence.

The remaining breaking members 230a may be structured such that they can be broken in sequence along the rotational direction, or they can be broken in an irregular fashion.

In this way, according to the present invention, the remaining breaking members 230a remaining in the driven-side connection member 220 are broken one at a time at certain period of time intervals, regardless the breaking order thereof.

That is, the above three breaking members 230 are designed so as to be broken at the same time when a torque above a pre-set value is exerted thereto, thereby preventing damage of the engine belt and the compressor 50. At this time, after the breaking member 230 is primarily broken, if all the breaking portion 240 are contacted at the same time with all the remaining breaking members 230a, a belt slip occurs due to a secondary impact, thereby resulting in breaking of the engine belt and damages to the compressor 50.

Therefore, it is preferable that each remaining breaking member 230a to be remained in the driven-side connection member 220 within an originally designed break torque of the breaking member 230. For this purpose, according to the invention, as described above, the breaking portion 240 is formed in the drive-side connection member 210, in such a manner that each has a different arrangement angle a, b, c from each respective breaking member, and thus all the remaining breaking members 230a can be broken within the originally designed break torque.

Figure 15:
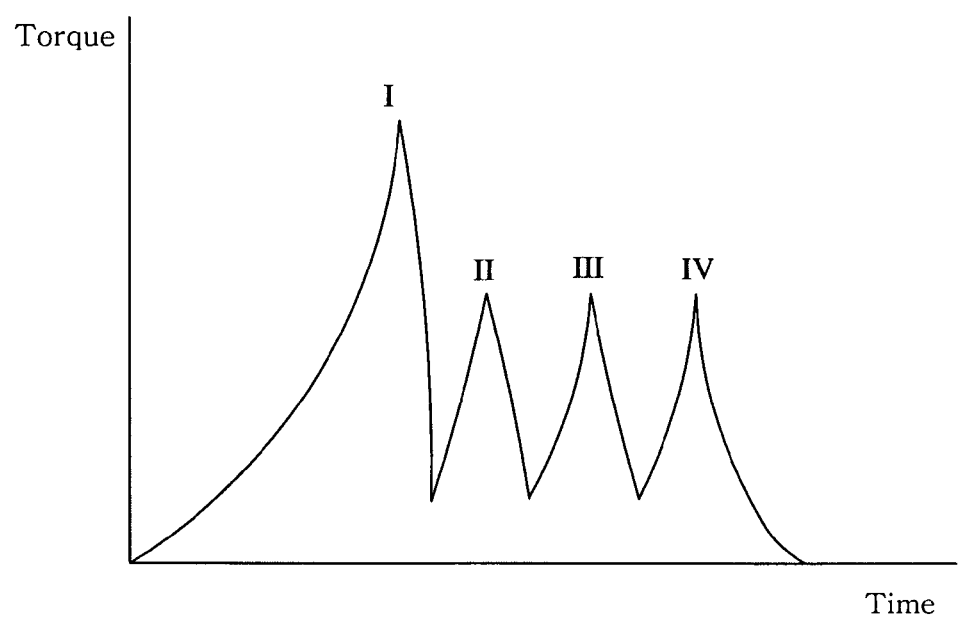
FIG. 15 is a graph showing a torque change per unit time when the breaking member is broken by a torque above a preset value.

FIG. 15 is a graph showing a torque change per unit time when the breaking member is broken by a torque above a preset value. As shown in FIG. 15, the point I corresponds to when the three breaking members 230 are broken at the same time and the originally designed break torque is exerted. In the points II, III, and IV, after the breaking members 230 are broken, each breaking portion 240 contacts each respective remaining breaking member 230a in sequence to thereby break it in sequence. At this time, the remaining breaking member 230a is broken at a lower torque, as compared with when in the primary break.

Therefore, since all the remaining breaking members 230a remaining in the driven-side connection member 220 are broken within the primary break torque after the primary break of the breaking member 230, the engine belt is prevented from breaking when in the secondary impact and the remaining breaking member 230a is completely released/removed from the entire structure of device to thereby avoid noise generation.

Figure 16:
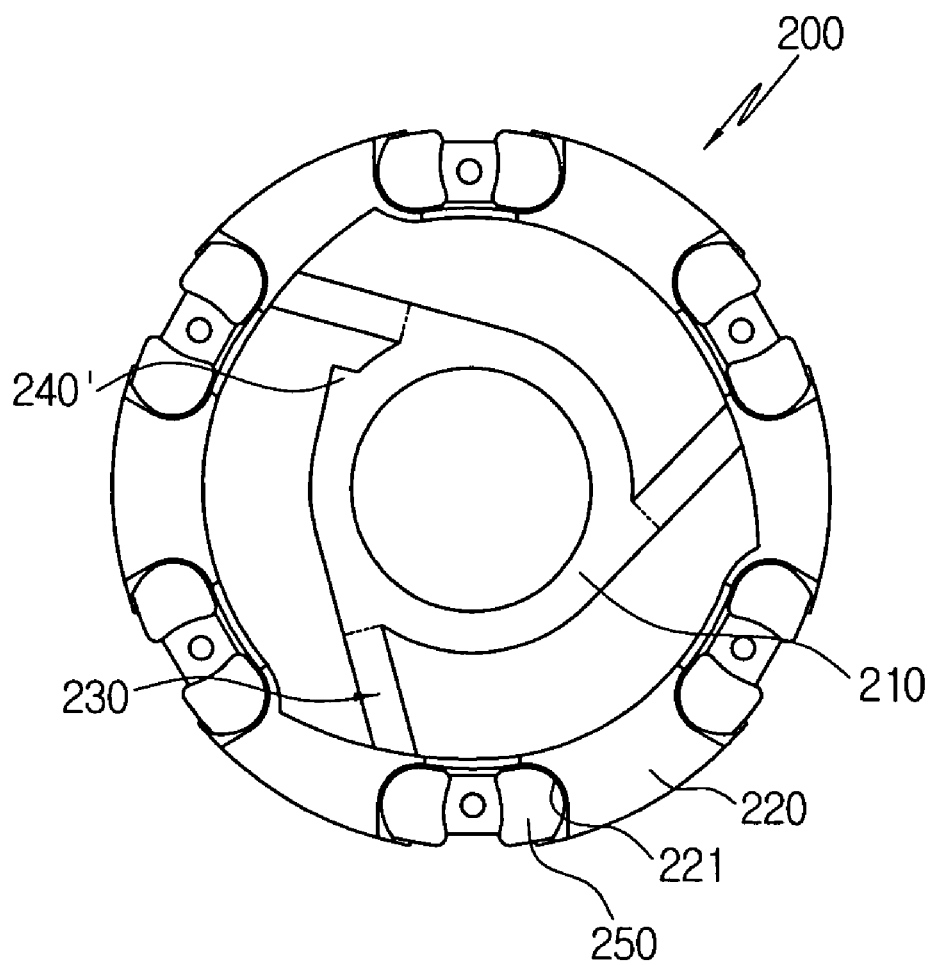
FIG. 16 is a plan view of a connector according to another embodiment of the invention, where the number of breaking portion is modified.

FIG. 16 is a plan view of a connector according to another embodiment of the invention, where the number of breaking portion is modified. As shown in FIG. 16, in the previous embodiment, the number of the breaking portion 240' formed in the drive-side connection member 210 is the same as that of the breaking member 230. As illustrated in FIG. 16, however, a single breaking portion 240' can achieve the effects of the invention adequately.

That is, it is preferred to have at lease one breaking portion 240'. Depending on a design purpose, the number of the breaking portion 240' may vary.

Therefore, in the case of a single breaking portion 240' when a torque above the preset value is generated in the compressor 50, the plurality of the breaking numbers 230 is primarily broken simultaneously, and thereafter the single breaking portion 240' contacts the plural remaining breaking member 230a in sequence, which thereby be secondarily broken one at a time in sequence.

The operation of the power transmission device according to the second embodiment of the invention will be described below. The same details as in the first embodiment will not be repeated here.

If a failure, such as seizing, occurs inside the compressor 50 and the driving shaft 60 stops rotating, the hub 110 suffers a torque larger than when it rotates. If the torque exceeds a preset value, the breaking members 230 are primarily broken simultaneously.

Even if the breaking member 230 is primarily broken, the pulley 100 continues to rotate by means of a rotating force from the engine. Accordingly, the drive-side connection member 210 coupled to the pulley 100 keeps rotating together. At this time, the breaking portion 240 formed in the drive-side connection member 210 contacts and secondarily breaks the remaining breaking member 230a still existing in the driven-side connection member 220 in sequence, thereby removing them from the structure (the driven-side connection member).

In this way, as the breaking member 230 is primarily and secondarily broken, the breaking member is released in debris form, thereby consequently interrupting the connection between the drive-side connection member 210 and the driven-side connection member 220. That is, the power transmission path from the pulley 110 to the driving shaft 50 of the compressor 50 is instantly cut off, thereby preventing the compressor 50 from damaging.

Furthermore, since the breaking member 230 is released and separated in debris form, even if the drive-side connection member 210 continues to rotate by means of the pulley 100, interference does not occur so that noise is not generated and also a failure of the engine belt can be prevented.

As described above, according to the present invention, a connector can be commonly used regardless of the material or the forming process of the pulley. The structure of the connector can be simplified to provide a damping means and thus reduce the manufacturing cost. When the design specification and shape of the pulley are changed, the structure of the connector can be partially modified, thereby resiliently conforming to a change in the pulley.

In addition, a separate connector having a breaking member is connected in one side of the pulley and also the entire connector is wrapped around by the hub, so that, after the breaking member is broken, the connector is not released, prevents the broken debris from scattering, and is protected from an external impact.

Furthermore, when a torque above a preset value is generated in the compressor, the breaking member connecting the pulley side with the hub side is broken and a remaining breaking member causing an interference is broken in sequence at certain time intervals to thereby escape from the structure of device, thereby avoiding a failure of the engine belt and unnecessary noise.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A power transmission device for a clutchless compressor comprising:
   a pulley rotatably installed in a front housing of a compressor and rotated by a rotational force from a driving power source, the pulley having a protruding flange formed in one side face thereof;
   a hub disposed in one side of the pulley, the hub having a hub body to be connected with a driving shaft of the compressor and a cover plate integrally formed in the outer peripheral face of the hub body; and
   a connector including a drive-side connection member detachably connected to one side of the pulley through a first coupling means, a driven-side connection member connected to the hub through a second coupling means, a breaking member for connecting the drive-side connection member with the driven-side connection member so as to be broken when a torque above a pre-set value is generated in the compressor, the second coupling means including a plurality of coupling grooves formed in the outer peripheral face of the driven-side connection member, a damper to be connected to the coupling groove, and a projection formed in the inner face of the cover plate of the hub and to be connected with the damper.

2. The power transmission device according to claim 1, wherein the first coupling means comprises the flange and the drive-side connection member that are screwed together by means of respective threads.

3. The power transmission device according to claim 1, wherein the first coupling means comprises the flange and the drive-side connection member that are connected by forcibly press-fitting the flange into the inside of the drive-side connection member.

4. The power transmission device according to claim 3, wherein projected and recessed parts are formed in at least one of the outer peripheral face of the flange and the inner peripheral face of the drive-side connection member.

5. The power transmission device according to claim 1, wherein the connector is disposed in an inner space formed between the cover plate of the hub and the pulley.

6. The power transmission device according to claim 1, wherein the pulley is made of a synthetic resin material and the flange is made of a steel material.

7. The power transmission device according to claim 1, wherein a connection plate protruded toward the inside of the coupling groove is formed in the bottom of the coupling groove so that that the damper can be inserted and connected thereto.

8. The power transmission device according to claim 7, wherein the damper includes a pair of resting portions to be rested on the coupling groove and spaced apart from each other such that the projection can be inserted and connected in-between, and a supporting portion connecting the pair of resting portions with each other and forming an inserting groove so as to be inserted into the connection plate.

9. The power transmission device according to claim 1, wherein the bottom face and the inner side wall face of the coupling groove are bent in a rounded shape.

10. The power transmission device according to claim 1, wherein the drive-side connection member is provided with a breaking portion formed so as to break a remaining breaking member still existing in the driven-side connection member in case where the breaking member is broken.

11. The power transmission device according to claim 10, wherein the breaking portion is protrusively formed from the outer peripheral face of the drive-side connection member.

12. The power transmission device according to claim 1, wherein the flange is integrally formed in one end portion of a bearing bore, which is installed in a through-hole of the pulley.

13. A power transmission device for a clutchless compressor comprising:
   a pulley rotatably installed in a front housing of a compressor and rotated by a rotational force from a driving power source, the pulley having a protruding flange formed in one side face thereof;
   a hub disposed in one side of the pulley, the hub having a hub body to be connected with a driving shaft of the compressor and a cover plate integrally formed in the outer peripheral face of the hub body; and
   a connector including a drive-side connection member detachably connected to one side of the pulley through a first coupling means, a driven-side connection member connected to the hub through a second coupling means, a breaking member for connecting the drive-side connection member with the driven-side connection member so as to be broken when a torque above a pre-set value is generated in the compressor;

wherein the drive-side connection member is provided with a breaking portion formed so as to break a remaining breaking member still existing in the driven-side connection member in case where the breaking member is broken;

wherein the breaking portion is formed in different arrangement angles (a, b, and c) from the breaking member such that it contacts the remaining breaking member in certain time intervals.

* * * * *